Feb. 13, 1968   R. E. SOLOMON   3,368,754
ENERGY CONTROL AND SAFETY DEVICE
Filed March 19, 1965   2 Sheets-Sheet 1

INVENTOR.
RALPH E. SOLOMON
BY
*Jaunewitz & Carr*
ATTORNEYS

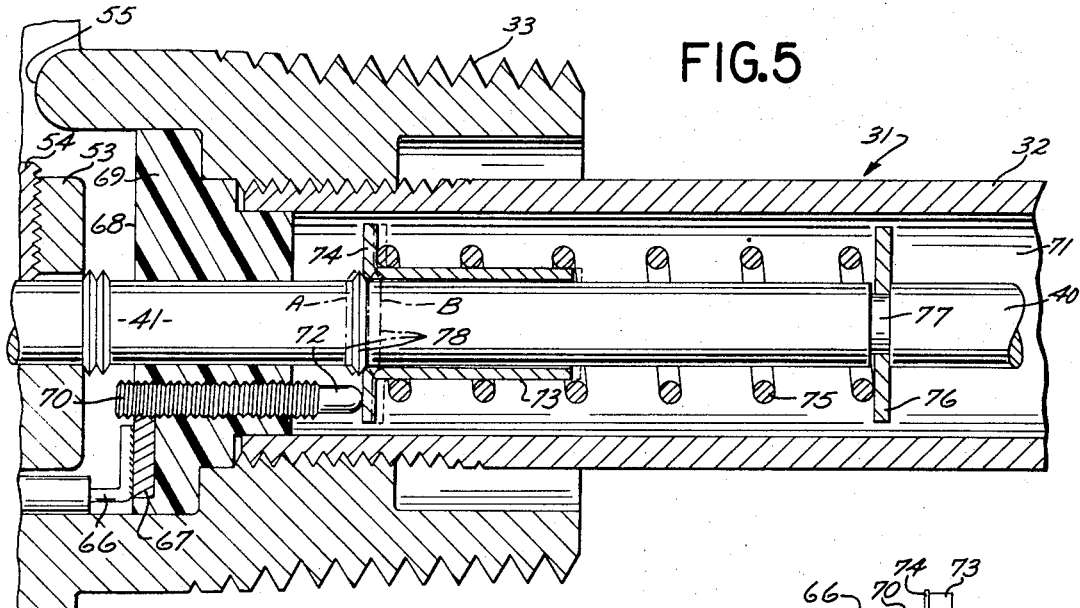
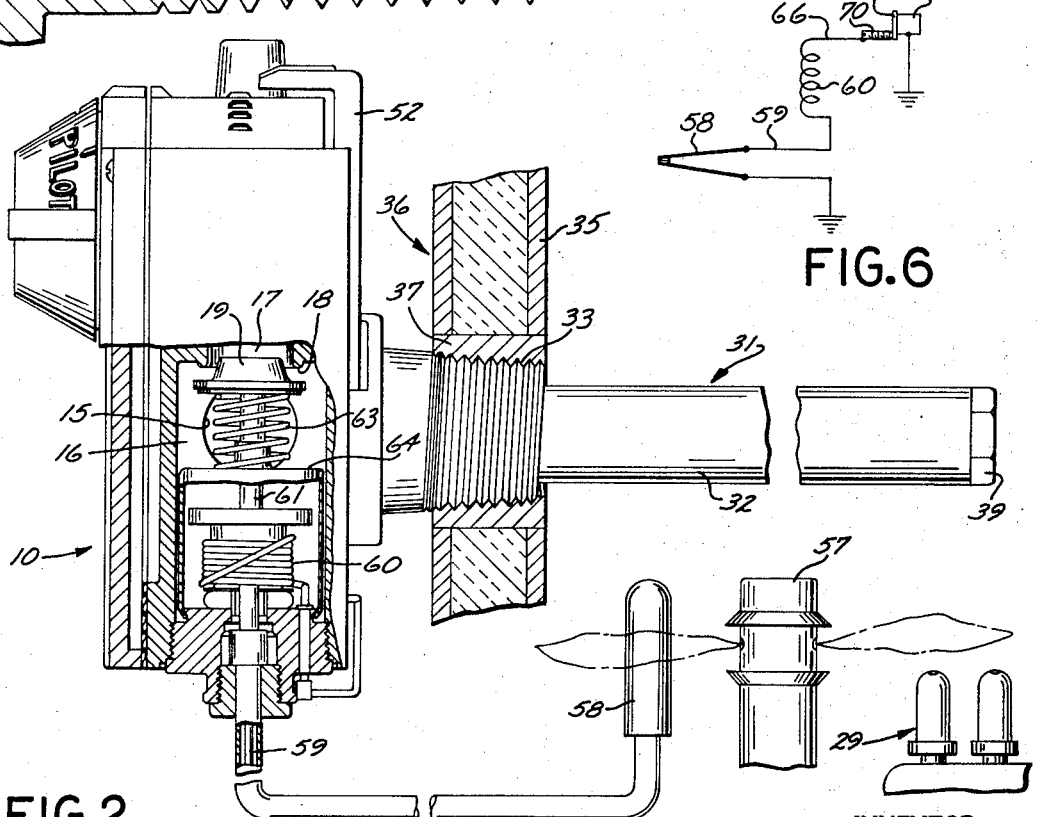
INVENTOR.
RALPH E. SOLOMON
BY
Gausewitz & Carr
ATTORNEYS 3,368,754
ENERGY CONTROL AND SAFETY DEVICE
Ralph E. Solomon, Los Angeles, Calif., assignor to Deutsch Controls Corp., Los Angeles, Calif., a corporation of California
Filed Mar. 19, 1965, Ser. No. 441,275
8 Claims. (Cl. 236—21)

ABSTRACT OF THE DISCLOSURE

A safety device for shutting off the supply of energy to a gas-fired appliance normally controlled by a rod-and-tube expansion unit, including a pair of contacts, one of which is fixed and the other of which moves with the rod, the contacts being series-connected in the circuit of an electro-magnet spring-biased to a closed position, but which normally is held open through current in the circuit so that, upon predetermined movement of the rod, the circuit is interrupted and the safety valve closed.

---

Appliances for heating fluid, such as gas-fired water heaters, include automatic controls for maintaining the contents of the tank within a predetermined temperature range. It is now being recognized that the heater control should provide some form of protection against overheating, cutting off the supply of fuel to the burner under certain conditions.

Occasionally, the automatic control for the fuel supplying the burner of a water heater will fail, permitting the burner to remain on so that the water in the storage tank rises to an unsafe temperature. For example, the thermostat valve may fail to close due to a particle of dirt lodged at the valve seat, or from other cause. When this occurs, the thermostat valve will not stop the supply of gas to the burner so that the burner continues to supply heat to the water in the tank. Ultimately, this can cause the water to reach the boiling point, and an explosion can take place. In other instances, steam may be released when an attempt is made to draw water by opening a faucet. Out of these hazards grows the need for a limiting arrangement which will shut off the supply of energy to the burner so that the water can never be heated excessively.

In the past, it has been proposed to provide a safety device mounted on the exterior surface of the water heater adjacent the top of the heater for causing the burner to cease its operation when the temperature at the top of the heater reaches a predetermined value. This arrangement has not accomplished its intended purpose, however, and frequently has not alleviated unsafe conditions. By being exteriorly mounted, these devices are subject to influences from the surrounding environment rather than being controlled solely by the temperature of the water in the tank. They are located near the top of the tank because this portion of the tank has been believed to achieve the highest temperature under certain aggravated conditions, such as from temperature stacking where there are repeated short draws of water. However, these devices must be set at temperature values where often there will be false shutdowns when the water within the tank actually has not become too hot. This is annoying, inconvenient and expensive. Moreover, these prior devices require elements to be strung along the exterior of the tank, which are subject to damage or malfunction from handling or service conditions.

Hence, there are various factors making these prior art designs ineffective. Due to such problems, frequently they are disconnected by maintenance personnel, nullifying the overtemperature safety control of this type. Other factors, such as high cost of manufacture, installation and maintenance, have limited the use of such devices.

The present invention provides an improved safety device that is unitary with the normal thermostat control for the heater. Experiments have demonstrated conclusively that it is far better to locate the safety limiting device at thermostat level than at the top of the tank as previously assumed. The temperature differential between lower and upper regions of the tank can be predetermined, so that safety control from the thermostat position is fully as realistic as at the top. Furthermore, in some instances the rate of temperature rise at the bottom part of the tank greatly exceeds that at the top which may be substantially at equilibrium. A safety device at the top will not detect this condition which can cause the lower part of the tank to reach excessively high temperatures. In addition, when the safety control is near the tank bottom, it will be brought into operation only when actually needed, so that there will not be burner shutdowns when the water in the tank has not in fact reached an unsafe temperature. The unit of this invention is fully immersed within the water so that it is controlled solely by the water temperature and is not influenced by exterior ambient conditions. The components of the device are fully submerged within the thermostat assembly so that it can be factory set and is not subject to efforts to calibrate it in the field. Accuracy is assured in this manner. The device is arranged to fail safe under all conditions. By being incorporated in a thermostat unit, there are no added costs of installing a separate safety control. Moreover, it is of low cost construction so that the added safety advantage is achieved with very little increased expense.

The device of this invention utilizes the movement of the expansible element of the thermostat control in causing a safety shutoff of the energy supply when the water in the tank overheats. This is in addition to the normal function of the expansion element in operating the thermostat valve. The arrangement of the invention is connected in the electrical circuit of the safety pilot valve customarily found in a heater control.

Existing water heater thermostats are constructed so that, when the pilot light goes out, the entire unit will shut down and must be relighted manually. For this reason, the thermostat assembly incorporates an electrical circuit in which a thermocouple sensing the heat of the pilot flame produces current that is conducted through a coil which holds a shutoff valve in an open position in opposition to a spring force. In the absence of a pilot flame, the current will cease, and the coil will release the valve to close the main gas inlet.

In accordance with the present invention, a movable contact is carried by the rod of the rod-and-tube probe of the thermostat control, and is engageable with a fixed contact series-connected in the safety pilot circuit. The movable contact is spring-loaded so that upon reduction of temperature in the tank the rod is free to move inwardly for opening the thermostat valve. When the tube has expanded sufficiently from a rise in temperature within the tank to move the rod outwardly a predetermined distance, the contacts will separate to interrupt the circuit of the holding coil of the safety valve. The spring bias on this valve then will cause it to close to shut off the main gas supply and preclude any further temperature rise. During normal operation of the thermostat, the contacts will remain in engagement, however, because at the upper limit of the thermostat operating range the rod will not have been caused to move sufficiently to effect separation of the contacts. In view of the fact that the rod always will actuate the thermostat valve at a preset axial position, the safety device will interrupt the circuit to shut the safety valve at a fixed temperature differential above the operating range of the thermostat, regardless of where the thermostat is set. Unlike other safety devices of this general type, the arrangement of this invention can utilize the characteristics of the expansion element of the thermostat, and does not need to rely upon an entirely separate device in accomplishing the safety override control. At the same time, the overtemperature control actuates a valve that is separate from the thermostat valve so that true safety control is accomplished. In other words, if the thermostat valve fails for any reason, including the lodging of dirt at the seat, the safety device will, nevertheless, cause the energy to shut off because a different valve is operated in shutting off the supply of energy to the burner.

An object of this invention is to provide an improved safety device for appliances such as storage-type automatic water heaters.

Another object of this invention is to provide a control for the supply of energy to appliances that includes an improved energy cutoff arrangement.

An additional object of this invention is to provide an energy cutoff device of extreme accuracy and reliability, and which fails safe under all circumstances.

Yet another object of this invention is to provide a low cost energy cutoff device that will not be subject to damage in handling or use and the operation of which will not be nullified.

A still further object of this invention is to provide an energy cutoff device utilizing the normal expansion element of the thermostat control, and which will shut down the energy supply at a fixed temperature differential above the setting of the thermostat regardless of the setting selected.

These and other objects will become apparent from the following detailed description taken in connection with the accompanying drawing in which:

FIGURE 2 is an enlarged sectional view of the control, partially in elevation, taken along line 2—2 of FIGURE 1;

FIGURE 5 is a further enlarged fragmentary sectional view of the inner portion of the probe assembly and the safety temperature limiting arrangement; and FIGURE 6 is a wiring diagram of the circuit of the safety control of this invention.

Figure 1:
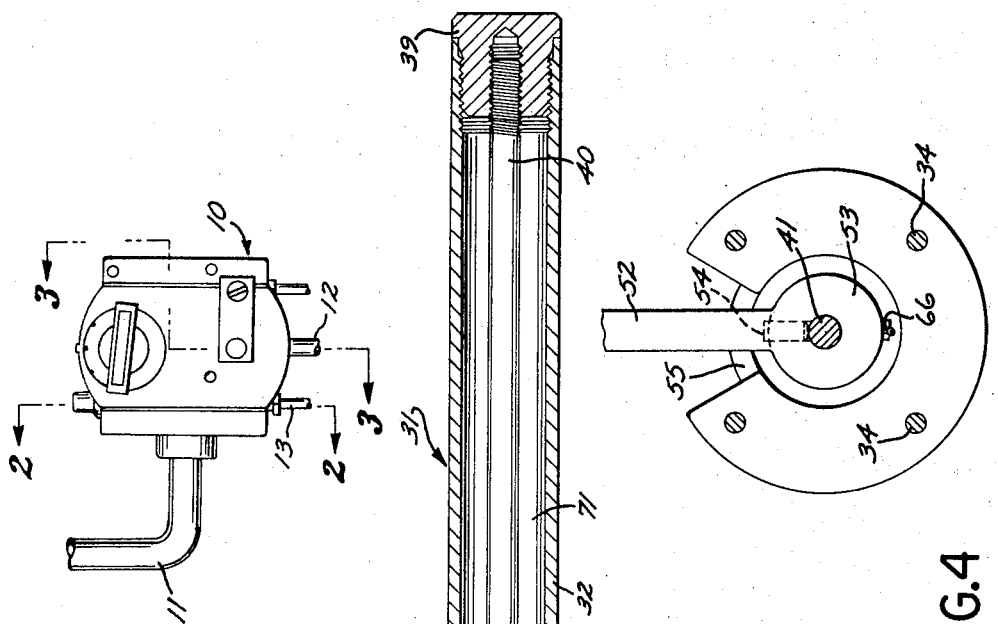
FIGURE 1 is an elevational view of a control unit for a water heater.
Figure 4:
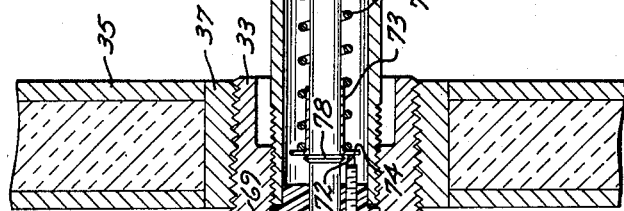
FIGURE 4 is a transverse sectional view illustrating the means for adjusting the length of the rod, taken along line 4—4 of FIGURE 3.

With reference to the drawing, FIGURE 1 illustrates an elevational view of the typical water heater thermostat control unit 10 that receives gas from a supply line 11 and regulates the flow of it through conduit 12 to the burner that supplies heat to the appliance. This control is the on-off type, causing intermittent operation of the burner to maintain the water in the tank in a predetermined temperature range. A portion of the gas from the inlet 11 leaves the control 10 through a line 13 to the pilot for the burner.

With reference to FIGURE 2, the gas entering the control 10 from the line 11 flows through an inlet port 15 into a chamber 16. The gas leaves the chamber 16 through a passageway 17 at the entrance of which is an annular seat 18 engageable by a shutoff valve 19. During normal operation of the appliance, the valve 19 will be open in the position indicated in FIGURE 2.

Figure 3:
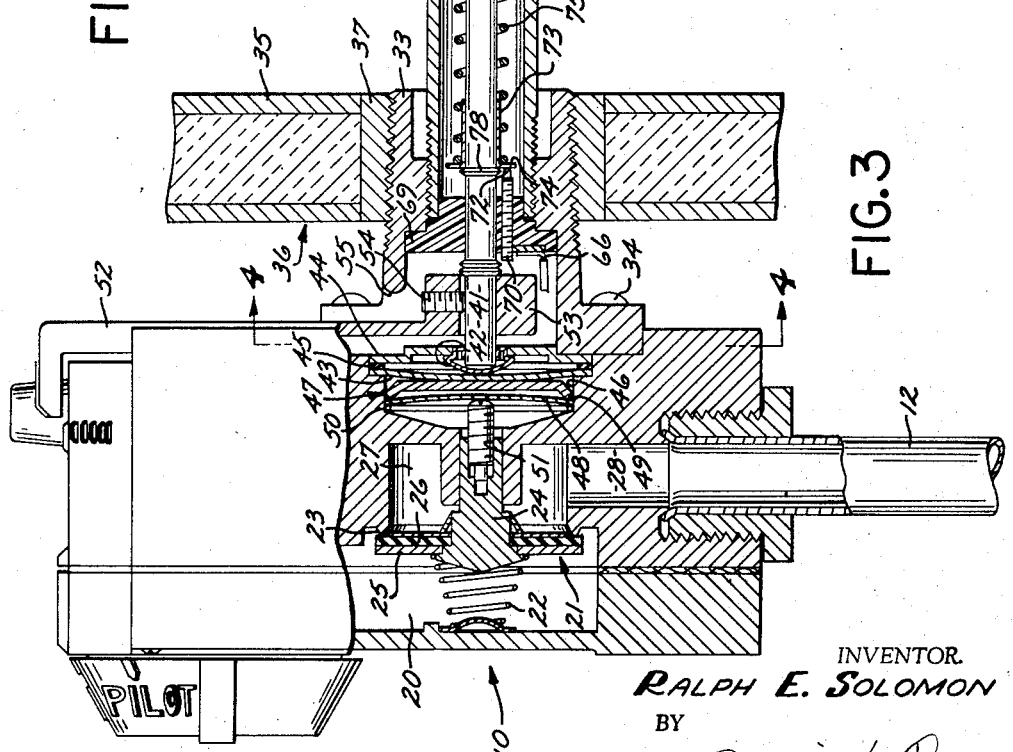
FIGURE 3 is an enlarged sectional view of the control, taken along line 3—3 of FIGURE 1.

The passageway 17 connects to a chamber 20 seen in FIGURE 3. In this chamber is a thermostat valve 21 biased by a compression spring 22 toward a position of engagement with an annular valve seat 23. The thermostat valve includes a stem 24 carrying a metal disc 25 along the inner face of which is a second disc 26 of a suitable elastomeric material to accomplish a gas-tight seal upon engagement with the seat 23. When the valve 21 is raised from the seat 23, gas can flow into a chamber 27 that, through passageway 28, connects to the line 12 leading to the burner 29. (The latter element is shown in FIGURE 2.) With the valve 21 closed, on the other hand, gas cannot enter the line 12 so that the burner 29 is extinguished, and no heat is imparted to the contents of the tank.

Control of the valve 21 is accomplished by a probe 31 that includes a tube 32 of a material, such as copper, having a relatively high coefficient of thermal expansion. The inner end of the tube 32 threads into a shank 33 that is fastened to the body of the control 10 by suitable means, such as the fasteners 34. The shank 33 provides the means for mounting the control 10 in the wall 35 of a water heater 36. There are exterior threads on the shank 33 which can be screwed into corresponding threads in a coupling 37 welded into the wall 35 of the water heater. This positions the probe 31 inside the heater, usually at the bottom portion, where it is subject to the ambient temperature of the water in the tank.

The outer end of the tube 32 carries a cap 39 into which is threaded the outer end of a rod 40 that is coaxial with the tube. The rod 40 is of a material of a relatively low coefficient of thermal expansion, such as Invar. The inner end portion 41 of the rod 40 carries a dome-shaped element 42 that bears against a sealing diaphragm 43 that is held in place by a retainer 44 bearing against a gasket 45. On the inside of the diaphragm 43 is an annular cavity 46 receiving a plunger disc 47 adjacent a valve-actuating disc 48. The plunger disc 47 has an annular corner edge 49 that engages the actuating disc 48 inwardly of its periphery. The line of contact between the edge 49 of the plunger 47 and the actuating disc 48 also is inwardly of a ring 50 at the periphery of the disc 48 and on the opposite side from the plunger 47. The stem 24 of the thermostat valve 21 carries a screw 51 which extends into the chamber 46 and also engages the actuating disc 48 on the side opposite from the plunger disc 47.

The actuating disc 48 is of dished configuration, having a free position substantially as shown in FIGURE 3. In this position, it is bowed to the right as the device is illustrated. Hence, the spring 22 can close the valve 21 against its seat 23 without opposition from the disc 48. On the other hand, if the rod 40 should move to the left, the plunger 47 will react against the disc 48 so that the corner 49 of the disc 47 urges the disc 48 to the left, against the resistance of the ring 50 at the periphery of the disc 48. Ultimately, this will create sufficient force to snap the disc 48 over center so that it is bowed in the direction opposite from that shown in FIGURE 3. When this takes place, the center portion of the disc 48 will project to the left instead of to the right as it did previously. Upon this occurrence, the disc 48 reacts through the screw 51 on the stem 24 of the valve 21 to snap the valve 21 to the open position away from the seat 23. Consequently, gas is allowed to flow from the chamber 20 into the chamber 27, the passage 28 and the line 12 to the burner 29.

The movement of the rod 40 to open the thermostat valve comes about from the contraction of the tube 32 that at its outer end carries the rod 40. (The Invar rod changes length so slightly under the temperature differentials encountered in a water heater that this factor may be ignored for practical purposes.) As the water in the tank 36 decreases in temperature, the tube 32 becomes shorter so that its outer end moves to the left toward the shank 33. This shifts the rod 40 in the same direction so that the inner end of the rod, through the plunger 47, causes the disc 48 to snap over center as described above. Gas then flows through the line 12 to the burner 29, commencing a rise in the temperature of the water in the tank. As the water temperature increases, the tube 32 will begin to expand so that its outer end moves to the right, as the device is shown. This causes the rod 40 also to shift to the right, returning it to the position of FIG- URE 3. That movement permits the disc 48 to snap back to its free position so that, in turn, the spring 22 closes the thermostat valve 21. Consequently, the flow of gas to the burner 29 is shut off and the burner is extinguished. In normal operation of the heater, the tube 32 expands and contracts with the raising and lowering of the water temperature to cause the thermostat valve to close and open intermittently to maintain the temperature of the tank within a predetermined range.

Adjustment of the temperature maintained in the tank by the thermostat control is accomplished by varying the effective length of the rod 40. Obviously, if the rod 40 is longer than as it is shown in FIGURE 3, its inner end 41 will be farther to the left for any temperature to which the probe 31 is subjected. With a longer rod 40, therefore, it will be necessary for the tube 32 to expand a greater amount to move the inner end 41 to the position of FIGURE 3, where the disc 48 snaps to its free position, allowing the thermostat valve 21 to close. A longer rod, therefore, means that the thermostat will cause the burner to raise the temperature of the water in the tank to a higher range. Conversely, of course, the shorter the rod 40, the lower the range of water temperature maintained in the tank.

Variation in the length of the rod 40 is accomplished through a lever 52 having a hub 53 circumscribing the inner end 41 of the rod 40 and rotationally locked with respect to the rod through a set screw 54. The lever 52 projects outwardly through a slot 55 so that it can be manually turned to permit selection of a desired temperature range setting. The lever 52 rotates the rod 40 relative to the cap 39 and the tube 32, which are fixed with respect to the shank 33 and the remainder of the control. In view of the threaded connection between the rod 40 and the cap 39, the length of the rod 40 projecting from the cap is governed by the rotation of the rod effected through the lever 52, which adjusts the axial position of the rod.

In normal water heater construction, the valve 19 acts as a safety device to prevent flow of gas to the burner 29 in the event that the pilot 57 should go out. This is accomplished through a thermocouple 58 adjacent the pilot burner 57, receiving heat from the pilot. The thermocouple, when so heated, generates current which flows through a conductor 59 to a coil 60 located in the control housing. Consequently, the coil 60 generates an electromagnetic force upon the lower end portion of the stem 61 of the valve 19, which acts as an armature. The coil 60, therefore, exerts a force through the stem 61 urging the valve 19 downwardly to the position of FIGURE 2, where it is elevated from the seat 18, and communication is provided from the chamber 15 to the passageway 17. This force is sufficient to hold the valve in the open position against the force of a compression spring 63 that bears against the undersurface of the valve member 19 and the upper surface of the housing 64 for the coil 60. In the event that the pilot flame should become extinguished, the thermocouple 58 no longer will be subjected to heat from it and will not generate current in the conductor 59. Upon this occurrence, the coil 60 will not be energized so that there no longer will be a holding force on the stem 61. Therefore, the spring 63 can close the valve 19 against the seat 18 to shut off all supply of gas to the burner 29. The coil 60 exerts a force adequate to hold the valve stem 61 only, and will not draw the valve 19 away from its seat, so that manual resetting is necessary once the valve 19 has closed.

The energy cutoff arrangement of this invention utilizes the circuit of the safety pilot valve to cause the valve 19 to close in the event that the water in the tank exceeds an established temperature. This comes about through an inerruption of the circuit to the coil 60 so that the spring 63 will close the valve 19 just as it does when the pilot goes out.

Current from the coil 60 is conducted through a wire 66, which at its end is connected by soldering, brazing or the like to a small electrically conductive plate 67 (see FIGURE 5). The latter member is embedded in the inner face 68 of a plug 69 of dielectric material. The plug 69 circumscribes the rod 40 in the inner part of the shank 33 and extends to the inner end of the tube 32. Through the insulating plug 69, parallel to its axis, is a threaded opening that receives a screw 70. The opening through the insulator 69 is positioned so that it includes an edge of the plate 67. Hence, there is engagement and an electrical connection between the plate 67 and the screw 70.

At its outer or right-hand end, the screw 70 projects into the space 71 between the rod 40 and the tube 32, and carries an electrical contact 72, preferably a gold contact bonded to the end of the screw. A sleeve 73 of electrically conductive material is adjacent the screw 70, having a flange 74 normally engaging the end of the contact 72. A compression spring 75 circumscribes the rod 40 and the sleeve 73, biasing the flange 74 of the sleeve toward the contact 72. The outer end of the spring 75 is retained against axial movement by a retainer disc 76 that fits in an annular groove 77 in the rod 40. The rod 40 also includes a raised bead portion 78 adjacent the flange 74.

Under normal circumstances, the elements described above provide the grounding portion of the circuit for the coil 60. The current passing through the coil is conducted through the wire 66 to the plate 67 and into the screw 70, and through that element and its contact 72 to the flange 74 of the sleeve 73. This, in turn, makes electrical connection to the rod 40, which is grounded. Hence, there is a completed circuit through the coil which, when energized by the thermocouple, will hold the valve 19 open.

The solid-line position shown in FIGURE 5 represents the location of the rod 40 at the upper end of the operating temperature range of the thermostat when the water temperature has caused the tube 32 to expand and move the rod to the right to close the thermostat valve 21. When the tube 32 contracts upon lowering of the temperature of the water in the tank, the rod 40 moves to the left from the position shown in FIGURE 5, shifting the inner end 41, including the bead 78, in the same direction to the position A indicated in phantom. Here, the flange 74 is held in firm engagement with the contact 72 through the influence of the spring 75 and the grounding circuit is maintained. The rod 40 is free to slide axially relative to the sleeve 73 so that the sleeve does not interfere with the movement of the rod. When the burner comes on and elevates the temperature in the tank, the parts will return to the solid-line position of FIGURE 5. Again, the contact 72 engages the flange 74 and there is electrical continuity for the coil circuit.

However, in the event of malfunction of the thermostat valve and resulting elevation of the temperature in the tank to a value above that of the preset range of the thermostat, the expanding tube 32 will carry the rod 40 with it beyond the normal outward position of the rod. Thus, the inner end 41 of the rod will be shifted further to the right to the position B illustrated in phantom. When this occurs, the bead 78 on the rod 40 acts as an abutment that picks up the flange 74 of the sleeve 73 and moves the sleeve 73 with the inner end of the rod. As soon as the flange 74 becomes separated from the contact 72 as a result of this movement, the circuit of the coil 60 is interrupted. This means that the coil no longer is energized so that its electromagnetic force is lost and the compression spring 63 will close the valve 19. That, in turn, shuts off all gas supply to the burner 29. The source of energy is blocked, and no further heat can be transferred to the contents of the tank. Thus, the probe 31, which is directly influenced by the temperature within the tank and not any external conditions, causes the circuit for the safety pilot valve to be interrupted when the temperature in the tank rises above the operating range of the thermostat valve. This is a fail safe system with the contact 72 and flange 74 acting as a normally closed switch, opening to break the existing circuit at the limiting condition.

The safety valve actuated in this manner is completely separate from the thermostat valve so that, regardless of the condition encountered at the thermostat valve, the safety shutdown will be realized. Hence, even if there should be foreign matter on the seat of the thermostat valve which prevents complete closing of it, the shutdown of the energy source will still occur because a separate valve is actuated. This separate valve, nevertheless, can perform its other function to shut down the gas supply in the event the pilot light should go out. This aspect of the valve 19 is not affected by the safety control arrangement. It should be observed also that the temperature-sensitive probe 31 through the provisions of this invention performs a dual function in controlling both the thermostat valve and the safety energy cutoff valve.

One of the features of the arrangement of this invention is that it results in the shutdown of the gas supply at a fixed predetermined temperature above the operating range of the thermostat, regardless of the adjustment of this range. In assembling the control, the screw 76 will be axially positioned relative to the rod 40 so that the flange 74 will be caused to separate from the contact 72 at a desired temperature above the setting of the thermostat. This may be, for example, at around 5° F. above the thermostat snap-off temperature. When this is done, the safety control will always cause the energy supply to be interrupted at this 5° F. temperature differential above the thermostat operating range, regardless of what range is chosen through rotation of the lever 52. This occurs because the inner end of the rod 40 must always move to the same position to provide opening and closing of the thermostat valve, regardless of the effective length of the rod as established by the lever 52. For example, even if the rod were elongated relative to the tube 32, the inner end portion 41 of the rod must still reach the same position to allow the disc 48 to snap over center to its free position so that the spring 22 can close the valve 21. With this being true, it also follows that the bead 78 will cause the flange 74 to separate from the contact 72 at a given temperature rise above the temperature necessary to cause the rod to move to the right an amount which would normally cause the thermostat valve to close. By virtue of this invention, therefore, through one setting the safety override will cause the gas supply to be shut off completely at an established temperature above whatever thermostat setting may be selected.

The actual increment of travel of the tube 32 is quite small, so that there are no adverse effects from increased contact pressure as the rod is moved to the position A of FIGURE 5 as the tube contracts when the temperature in the tank is lowered. Despite its high coefficient of thermal expansion, the copper tube expands at a rate of only .00004 inch/° F. This means that the total movement of the tube, and hence the rod it carries, is only .0056 inch where the cold inlet water is at 40° F. and the tank temperature is set to rise to a maximum of 180° F. Hence, there will be only a negligible change in the spring force urging the contacts into interengagement during the operation of the water heater control.

The foregoing detailed description is to be clearly understood as given by way of illustration and example only, the spirit and scope of this invention being limited solely by the appended claims.

I claim:

1. In combination with a water heater control including a body having passage means therethrough for conducting gaseous fuel from a source of said gaseous fuel to a burner, a first valve in said passage means for normally controlling the flow of said gaseous fuel, a thermally expansible rod-and-tube element for controlling the movement of said first valve, said rod-and-tube element including a tube of a material of relatively high coefficient of thermal expansion and a rod of a material of relatively low coefficient of thermal expansion carried by said tube, said rod being operatively associated with said first valve for causing opening and closing of said first valve in response to the positioning of said rod by said tube, means for varying the effective length of said rod relative to said tube for varying the temperature at which said rod will cause opening and closing of said first valve, a second valve in said passage means independent of said first valve and movable between an open position for permitting flow through said passage means, and a closed position shutting off flow through said passage means, a resilient means biasing said second valve to said closed position, and an electromagnetic coil normally holding said second valve in said open position, a safety device for said water heater control comprising an electrically conductive means series-connected with said electromagnetic coil,
said electrically conductive means including a first relatively fixed contact means,
and a second contact means carried by said rod and normally engaging said first contact means,
said second contact means being rectilinearly movable by said rod, upon elevation of said rod-and-tube element to a predetermined temperature above the temperature normally required for closing said first valve, to a position remote from said first contact means for interrupting the circuit of said electromagnetic coil,
whereby said resilient means closes said second valve for shutting off the supply of gaseous fuel to said burner.

2. The device as recited in claim 1 in which said second contact means includes
an electrically conductive member slidable relative to said rod,
spring means normally holding said electrically conductive member is engagement with said first relatively fixed contact means,
and an abutment on said rod for engaging said electrically conductive member and moving the same away from said first relatively fixed contact means upon said movement of said rod in response to said elevated temperature of said tube.

3. A control device for a gas-fired storage-type water heater comprising
a housing having passage means therethrough adapted to conduct gaseous fuel from a source thereof to a burner for igniting such fuel and imparting heat to the contents of a water heater tank,
a first valve in said passage means for normally controlling the flow therethrough,
a probe insertable in a tank for controlling the operation of said first valve,
said probe including a tube of relatively high coefficient of thermal expansion,
one end of said tube being fixed with respect to said housing,
and the opposite end of said tube projecting outwardly therefrom,
and a rod of relatively low coefficient of thermal expansion,
one end of said rod threadably engaging said opposite end of said tube so that said rod extends inwardly of said tube toward said housing,
whereby said rod is movable axially by expansion and contraction of said tube,
the inner end of said rod at said housing being operatively connected to said first valve for causing said first valve to close upon expansion of said tube,
and causing said first valve to open upon contraction of said tube,
means for rotating said rod relative to said tube for causing change in the effective length of said rod relative to said tube for varying the temperatures at which said first valve is closed and opened upon expansion and contraction of said tube, a second valve in said passage means for shutting off all flow of gaseous fuel therethrough, a spring biasing said second valve to said closed position, an electromagnetic coil for holding said second valve in an open position, said electromagnetic coil being adapted for connection to a thermocouple subjected to heat from the pilot for said burner for generating a current through said electromagnetic coil so that said electromagnetic coil can hold said second valve in said open position, and an overtemperature safety means for causing said second valve to move to said closed position at a predetermined temperature, said safety means including a first relatively fixed contact adjacent said rod at the inner end portion of said rod, a second contact means normally engaging said first contact means, means electrically connecting said first and second contact means in series with said magnetic coil, and an abutment means movable with said rod and engageable with said second contact means upon expansion of said tube, said abutment means being remote from said second contact means when said tube is contracted for opening said first valve, said second contact means being positioned relative to said abutment means and said first contact means to be moved by said abutment means upon such engagement therewith to a position remote from said first contact means upon movement of said rod caused by expansion of said tube upon elevation of said tube to a predetermined temperature above that normally required for closing said first valve means, for thereby interrupting the circuit of said electromagnetic coil and causing said second valve means to move to said closed position.

4. A device as recited in claim 3 in which said second contact means includes an annular member circumscribing said rod, and a spring biasing said annular member to a position of engagement with said first contact means, said abutment means being integral with said rod and positioned to engage the end of said annular member adjacent said first contact means upon said expansion of said tubular member upon elevation to said predetermined temperature.

5. A control device for a gas-fired storage-type water heater comprising a housing having passage means therethrough adapted to conduct gaseous fuel from a source thereof to a burner for igniting such fuel and imparting heat to the contents of a water heater tank, a first valve in said passage means for normally controlling the flow therethrough, a probe insertable in a tank for controlling the operation of said first valve, said probe including a tube of relatively high coefficient of thermal expansion, one end of said tube being fixed with respect to said housing and the opposite end of said tube projecting outwardly therefrom, and a rod of relatively low coefficient of thermal expansion, one end of said rod threadably engaging said opposite end of said tube so that said rod extends inwardly of said tube toward said housing, whereby said rod is movable axially by expansion and contraction of said tube, the inner end of said rod at said housing being operatively connected to said first valve for causing said first valve to close upon expansion of said tube, and causing said first valve to open upon contraction of said tube, means for rotating said rod relative to said tube for causing change in the effective length of said rod relative to said tube for varying the temperatures at which said first valve is closed and opened upon expansion and contraction of said tube, a second valve in said passage means for shutting off all flow of gaseous fuel therethrough, a spring biasing said second valve to said closed position, an electromagnetic coil for holding said second valve in an open position, said electromagnetic coil being adapted for connection to a thermocouple subjected to heat from the pilot for said burner for generating a current through said electromagnetic coil so that said electromagnetic coil can hold said second valve in said open position, and an overtemperature safety means for causing said second valve to move to said closed position at a predetermined temperature, said safety means including a fixed annular member of dielectric material circumscribing said rod at the inner end portion of said tube, an electrically conductive member carried by said annular member and extending axially therefrom toward said opposite end of said tube, a sleeve of electrically conductive material circumscribing said rod outwardly of said electrically conductive member, said sleeve being slidable axially relative to said rod, a compression spring circumscribing said rod outwardly of said sleeve, stop means on said rod fixing the outer end of said compression spring relative to said rod, said spring engaging the outer end of said sleeve and biasing the opposite end of said sleeve into normal engagement with said electrically conductive member, means electrically connecting said electrically conductive member and said sleeve in series with said electromagnetic coil, and an abutment on said rod adjacent said opposite end of said sleeve, said abutment being movable with said rod to engage said opposite end of said sleeve and move said sleeve out of engagement with said electrically conductive member upon movement of said rod caused by expansion of said tube upon elevation of said tube to a predetermined temperature above that normally required for closing said first valve means, for thereby interrupting the circuit of said electromagnetic coil and causing said second valve means to move to a closed position.

6. A device as recited in claim 5 in which
said electrically conductive member is adjustable axially relative to said sleeve for thereby adjusting the predetermined temperature above that normally required for closing said first valve means at which said abutment moves said sleeve out of engagement with said electrically conductive member.

7. A device as recited in claim 5 in which said fixed annular member has a threaded opening therethrough substantially parallel to the axis thereof, and in which said electrically conductive member comprises a screw threadably received in said opening, the outer end of said screw including contact means thereon for said engagement with said sleeve.

8. A device as recited in claim 7 in which said abutment comprises an annular bead integrally formed on said rod.

References Cited

UNITED STATES PATENTS

| | | | |
|---|---|---|---|
| 2,389,519 | 11/1945 | Landon | 236—10 |
| 2,773,649 | 12/1956 | Hilgert | 236—21 |
| 2,994,755 | 8/1961 | Hildenbrandt et al. | |
| 3,231,193 | 1/1966 | Coffey | 236—21 |
| 3,286,923 | 11/1966 | Jackson et al. | 236—21 |

EDWARD J. MICHAEL, *Primary Examiner.*

Dedication 3,368,754.—*Ralph E. Solomon*, Los Angeles, Calif. ENERGY CONTROL AND SAFETY DEVICE. Patent dated Feb. 13, 1968. Dedication filed Oct. 13, 1969, by the assignee, *Controls Company of America.*

Hereby dedicates to the Public the entire terminal part of the term of said patent.

[*Official Gazette January 20, 1970.*]